(12) United States Patent
Pinckney, Sr.

(10) Patent No.: US 7,242,282 B2
(45) Date of Patent: Jul. 10, 2007

(54) WIRELESS ANTI-LOCKOUT SYSTEM

(76) Inventor: Edward Pinckney, Sr., 3768 Robbie Glover Rd., Awendaw, SC (US) 29429

( * ) Notice: Subject to any disclaimer, the term of this patent is extended or adjusted under 35 U.S.C. 154(b) by 224 days.

(21) Appl. No.: 11/032,034

(22) Filed: Jan. 11, 2005

(65) Prior Publication Data

US 2006/0158322 A1  Jul. 20, 2006

(51) Int. Cl.
*B60R 25/10* (2006.01)

(52) U.S. Cl. .................. 340/426.28; 340/426.29; 340/5.72

(58) Field of Classification Search .......... 340/426.28, 340/426.29, 426.3, 5.72, 5.61, 457; 200/43.01, 200/43.11, 43.18, 61.44
See application file for complete search history.

(56) References Cited

U.S. PATENT DOCUMENTS

| | | | |
|---|---|---|---|
| 3,399,554 A | 9/1968 | Hogue | 70/262 |
| 4,240,516 A | 12/1980 | Henderson et al. | 180/289 |
| 4,572,320 A | 2/1986 | Robbins, Jr. | 180/289 |
| 4,789,851 A | 12/1988 | Hock et al. | 340/457 |
| 4,942,747 A | 7/1990 | Pinnow | 70/263 |
| 5,113,182 A | 5/1992 | Suman et al. | 340/825.31 |
| 5,451,928 A | 9/1995 | Cody | 340/457 |
| 5,461,360 A | 10/1995 | Guim et al. | 340/457 |
| 5,504,377 A * | 4/1996 | Nowell | 307/10.1 |
| 5,600,302 A * | 2/1997 | Lewis | 340/457 |
| 5,659,291 A * | 8/1997 | Kennedy et al. | 340/457 |
| 5,831,520 A * | 11/1998 | Stephan | 340/457 |
| 6,396,390 B1 | 5/2002 | Achhammer et al. | 340/10.33 |
| 6,694,787 B1 | 2/2004 | Brown | 70/456 R |
| 6,919,812 B2 * | 7/2005 | Takee et al. | 340/686.1 |
| 2002/0003345 A1 | 1/2002 | Stanley et al. | |
| 2002/0041236 A1 | 4/2002 | Sakai et al. | |
| 2002/0063630 A1 | 5/2002 | Curtis et al. | |
| 2003/0048180 A1 | 3/2003 | Takee et al. | |
| 2004/0040390 A1 | 3/2004 | Kojima et al. | |
| 2004/0046659 A1 | 3/2004 | Kwon | |
| 2004/0100283 A1 | 5/2004 | Meyer et al. | |
| 2004/0135406 A1 | 7/2004 | Seto et al. | |

FOREIGN PATENT DOCUMENTS

| | | |
|---|---|---|
| DE | 42 40 426 A1 | 6/1994 |
| DE | 102 35 361 A1 | 10/2003 |
| JP | 09-078920 | 9/1995 |
| JP | 2000-213219 | 1/1999 |

* cited by examiner

*Primary Examiner*—Toan N. Pham
(74) *Attorney, Agent, or Firm*—Richard C. Litman

(57) ABSTRACT

The wireless anti-lockout system automatically unlocks a driver's side door when the driver locks the car keys within the car. The anti-lockout system includes door-lock and trunk-lock sensors, a key chain transponder, transponder sensors and an occupant presence sensor. When the doors and trunk are locked, the key chain transponder is detected in the car, and an occupant is not detected, signals are sent to a microprocessor, which alerts a door lock control to unlock the driver's side door and activates an alarm. Additional sensors may be added. The system may include a transmission sensor and a driver detection sensor, so that when a driver is not detected, or when the transmission gear is in park or neutral, in addition to the other three signal conditions, the door lock control unlocks the driver's side door and an alarm is activated.

12 Claims, 6 Drawing Sheets

WIRELESS ANTI-LOCKOUT SYSTEM

BACKGROUND OF THE INVENTION

1. Field of the Invention

The present invention relates to automobile lockout protection devices, and particularly to a wireless anti-lockout system that prevents drivers from locking their keys in their vehicles.

2. Description of the Related Art

Multiple systems for preventing keys from being locked in a car exist to alert the driver to the condition. Alarms or horns have been used to alert the driver that a key has been left in the ignition, and some systems allow the doors of the automobile to be unlocked.

While many of these systems provide an alarm or unlock the door if the key is left in the ignition or left in the car when the doors are locked, many systems do not protect against the unnecessary opening of the car doors or activation of an alarm. These systems do not, however, determine a number of things, such as whether the doors are locked, the occupant is in the car and the keys are anywhere in the car. Additional safety features, such as whether a driver is located in the automobile or if the transmission is out of park or neutral, are not included. It would be desirable to have a system that determines if anyone is in the car, if the keys are located anywhere in the car, if a driver is detected, and if the transmission is out of park or neutral.

Thus, a wireless anti-key locking device solving the aforementioned problems is desired.

SUMMARY OF THE INVENTION

The wireless anti-lockout system includes a key chain transponder, a plurality of door-lock sensors, a plurality of key readers, and an occupant sensor. Additionally, the anti-lockout system may include a driver-detected sensor and a transmission sensor. A microprocessor processes signals received from the sensors and the readers.

Each of the car doors contains a door-lock sensor connected to the locks, and the trunk contains both a trunk-lock sensor and a trunk lock button. Each of the car doors also has a transponder reader, and the roof and the trunk both have a transponder reader as well. A transponder is attached to a key chain holding the car keys, so that if the transponder readers detect the transponder in the car, a signal is sent to the microprocessor indicating the key chain is within the detection range of the reader. Further, a Passive Infrared (PIR) sensor with pet immunity using an enhanced detection system is located within the car to determine if an adult, animal or small child remains in the car.

Additionally, a transmission sensor is connected to the transmission gear to determine if the car is in park or neutral, or if the transmission is in gear. A driver-detection sensor, which may be a weight sensor, ascertains specifically whether a driver is sitting in the driver's seat. If all of the door-lock sensors and trunk-lock sensor indicate that the doors and trunk are closed and locked, at least one of the key readers detects the transponder, the occupant sensor determines after ten seconds that no adult occupant remains in the car, the transmission sensor detects that the car is in park or neutral, and the driver-detection sensor determines that there is no driver sitting in the driver's seat, then the microprocessor sends a signal to a door lock control to unlock the driver's side door. The microprocessor may send a signal to activate an alarm or horn.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
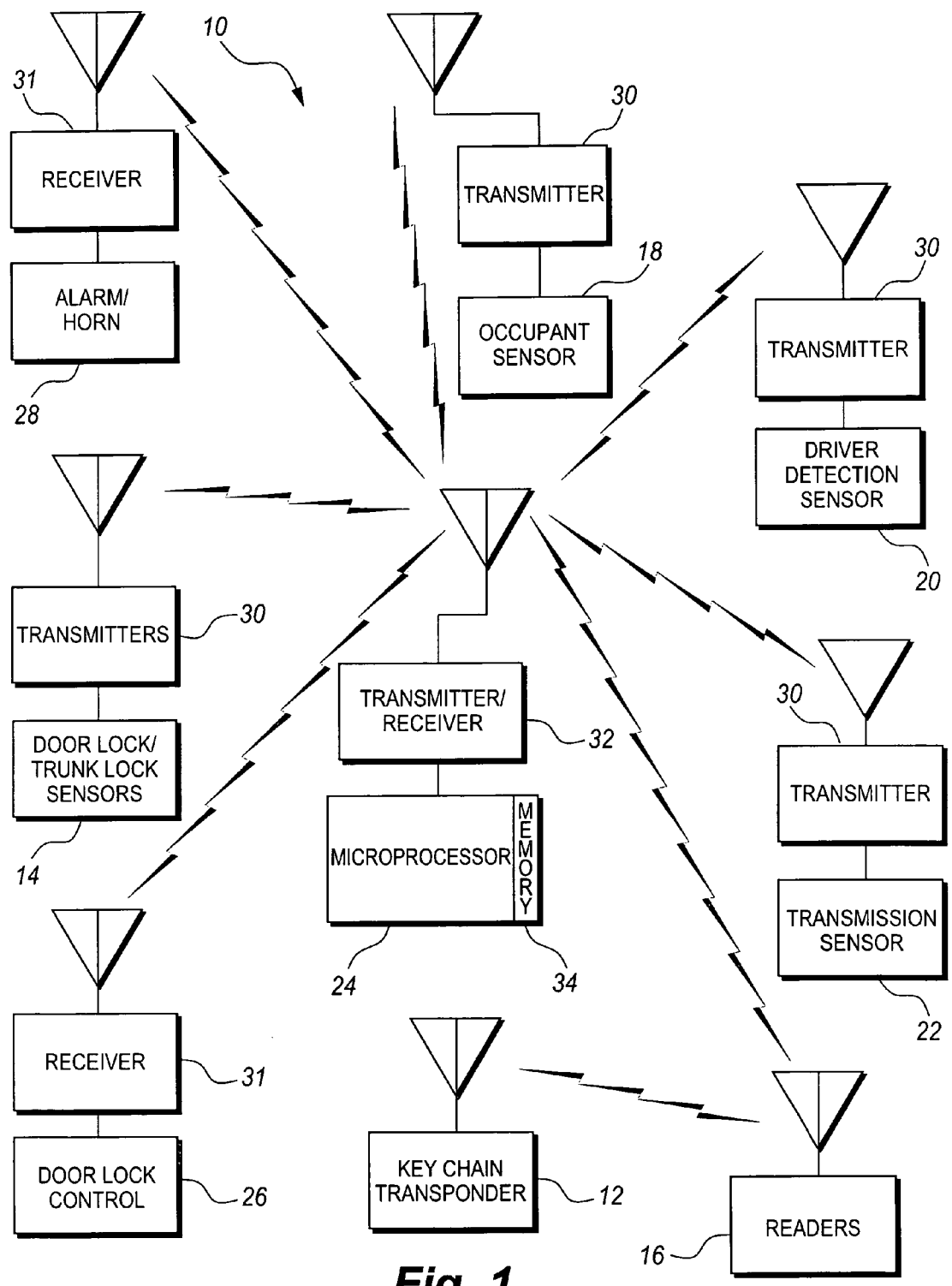
FIG. 1 is a block diagram of a wireless anti-lockout system according to the present invention.

The present invention is a wireless anti-lockout system that prevents a driver from locking himself outside of his car without his keys. The wireless anti-lockout system, designated generally as 10 in the drawings, automatically unlocks the driver's side door when the car keys are left in the car or trunk.

FIG. 1 is a block diagram of the wireless anti-lockout system 10. The anti-lockout system 10 includes a key chain transponder 12, a plurality of door-lock and trunk-lock sensors 14, a plurality of key readers 16, and an occupant sensor 18. Additionally, the anti-lockout system 10 may include a driver-detection sensor 20 and a transmission sensor 22. A microprocessor 24 processes signals received from the sensors 14, 18, 20 and 22 and the readers 16. The microprocessor 24 sends a signal to activate a door lock control 26 that is able to lock and unlock the driver's side door. The microprocessor 24 additionally sends a signal to activate an alarm or horn 28.

The microprocessor 24 is connected to a transmitter/receiver 32 for receiving input signals sent from the sensors 14, 18, 20 and 22 and the readers 16 and for sending output signals to the door lock control 26 and the alarm/horn 28. The microprocessor 24 is connected to a memory 34 capable of storing the received input signals.

The door-lock and trunk-lock sensors 14, the occupant sensor 18, the driver detection sensor 20 and the transmission sensor 22 are all coupled to individual transmitters 30 so that when the sensors generate specific signals, the input signals are sent to the transmitter/receiver 32, which is coupled to the microprocessor 24 for processing the signals. The door lock control 26 and the alarm/horn 28 are both coupled to individual receivers 31 so that the microprocessor 24 can send signals to the door lock control 26 and the alarm/horn 28.

The key readers 16 are located in all the car doors, in the roof of the car, and in the trunk of the car. The readers 16 send a signal out to the key chain transponder 12 attached to the car keys and, based on the response from the key chain transponder 12, a signal is sent from the readers 16, to the microprocessor 24.

Figure 2:
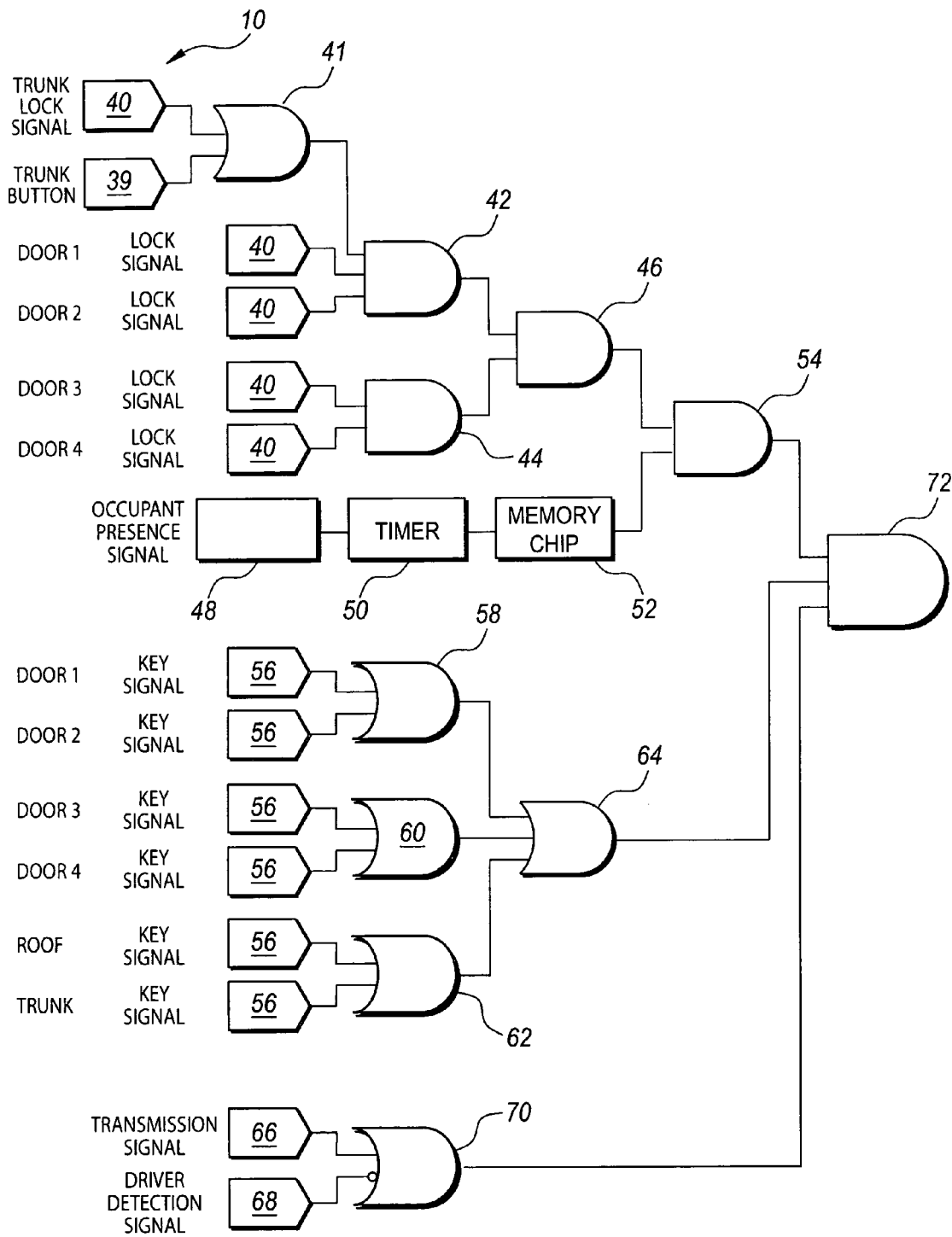
FIG. 2 is a logic diagram of the wireless anti-lockout system according to the present invention.
Figure 3A:
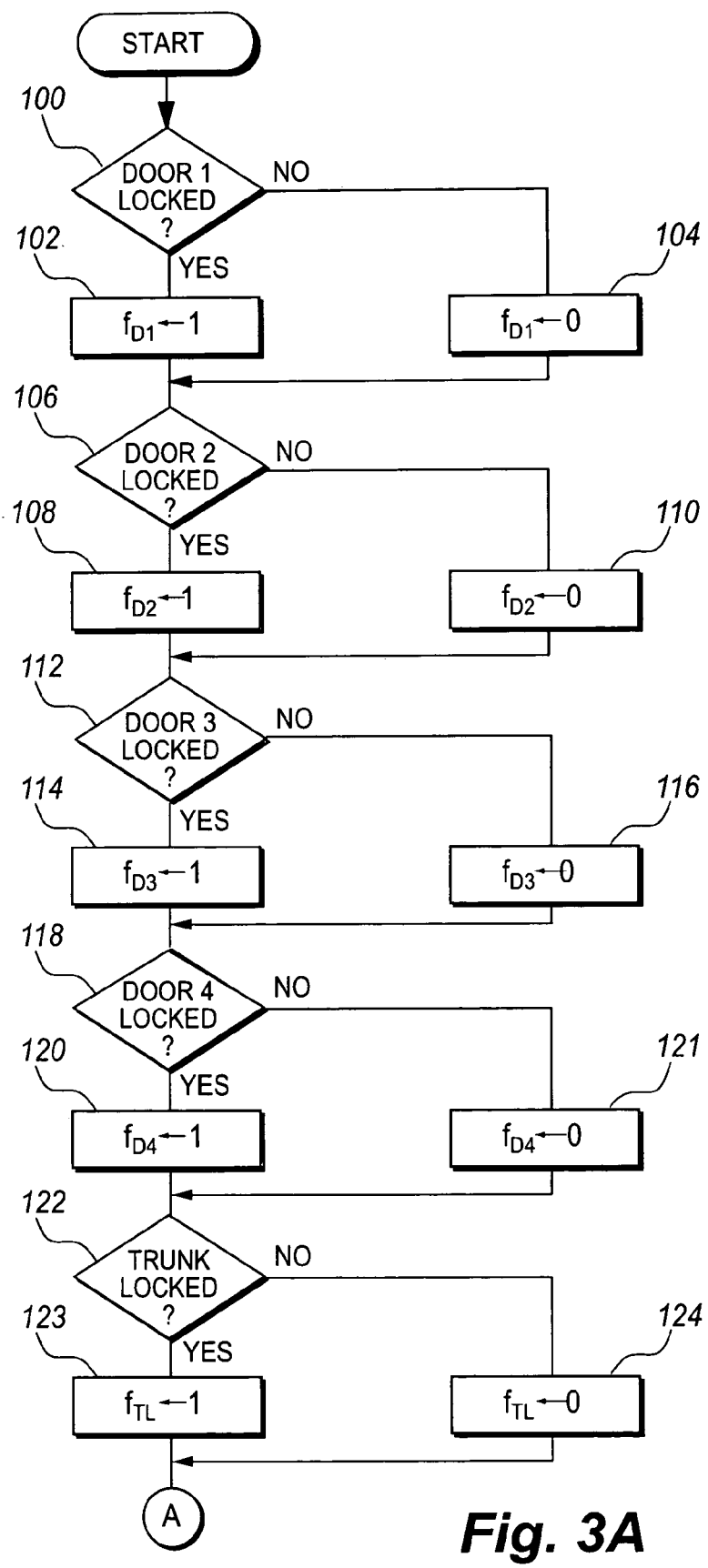
FIGS. 3A, 3B, 3C, and 3D comprise a flow chart showing the processing operation of the wireless anti-lockout system according to the present invention.
Figure 3B:
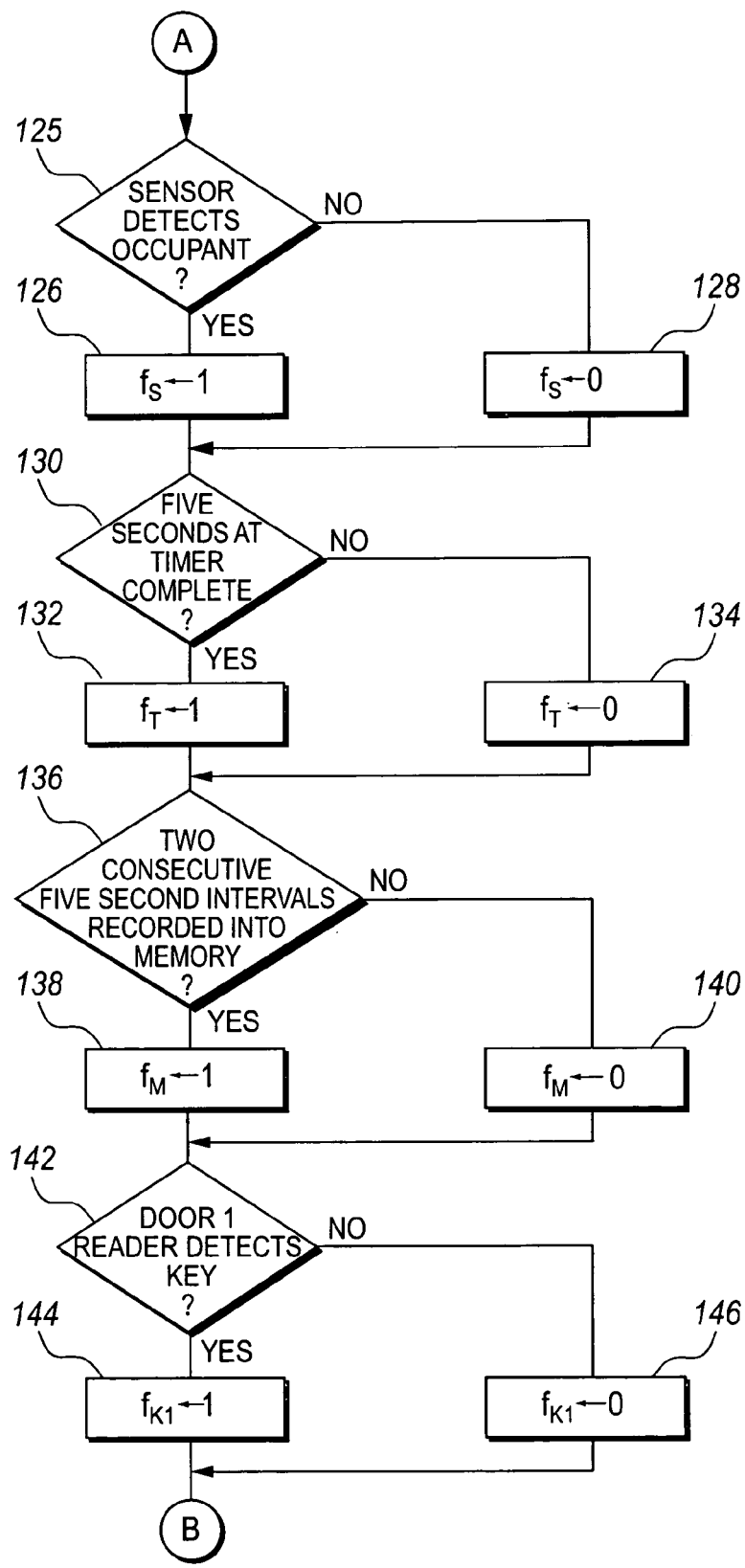
Figure 3C:
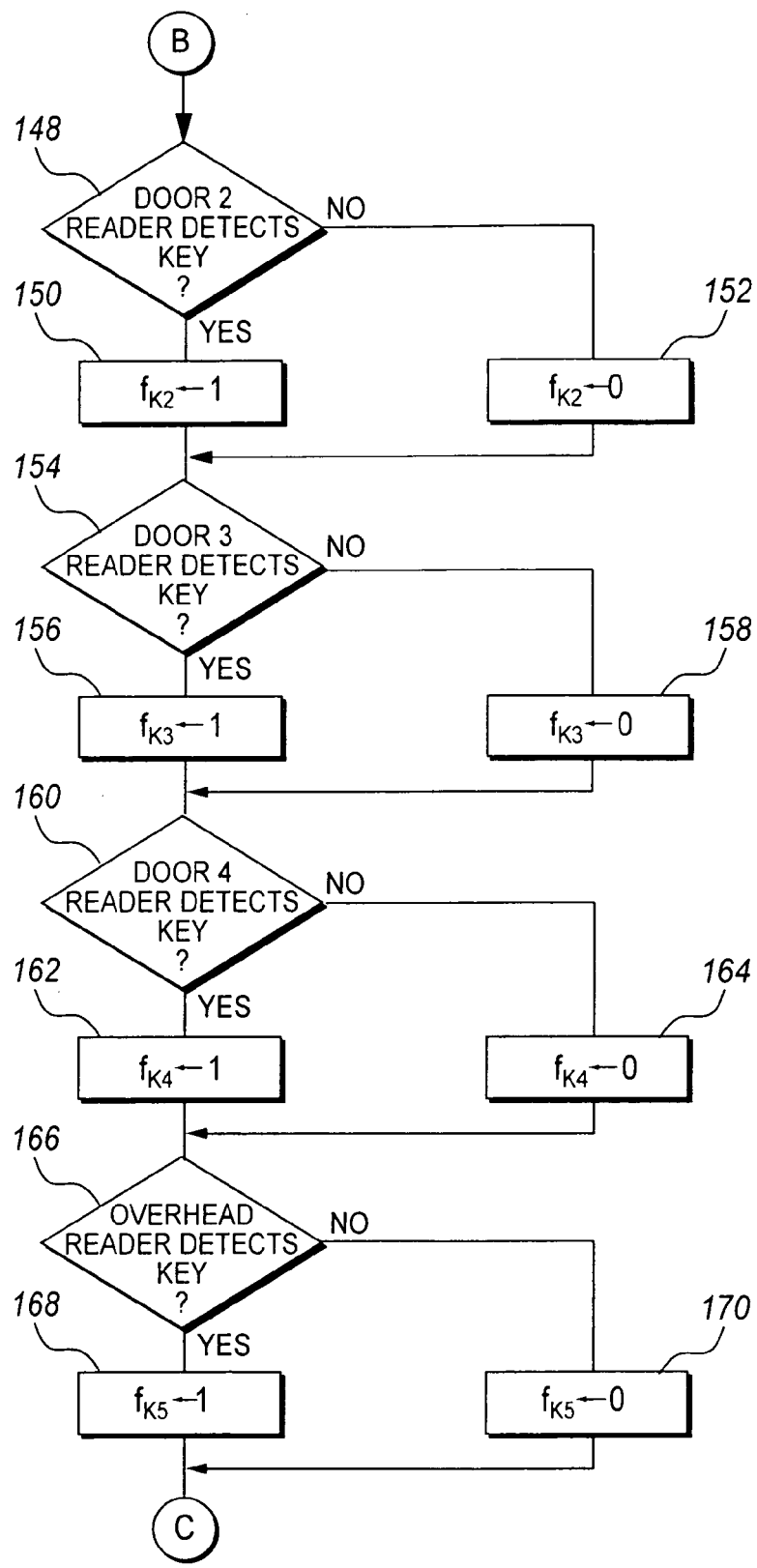
Figure 3D:
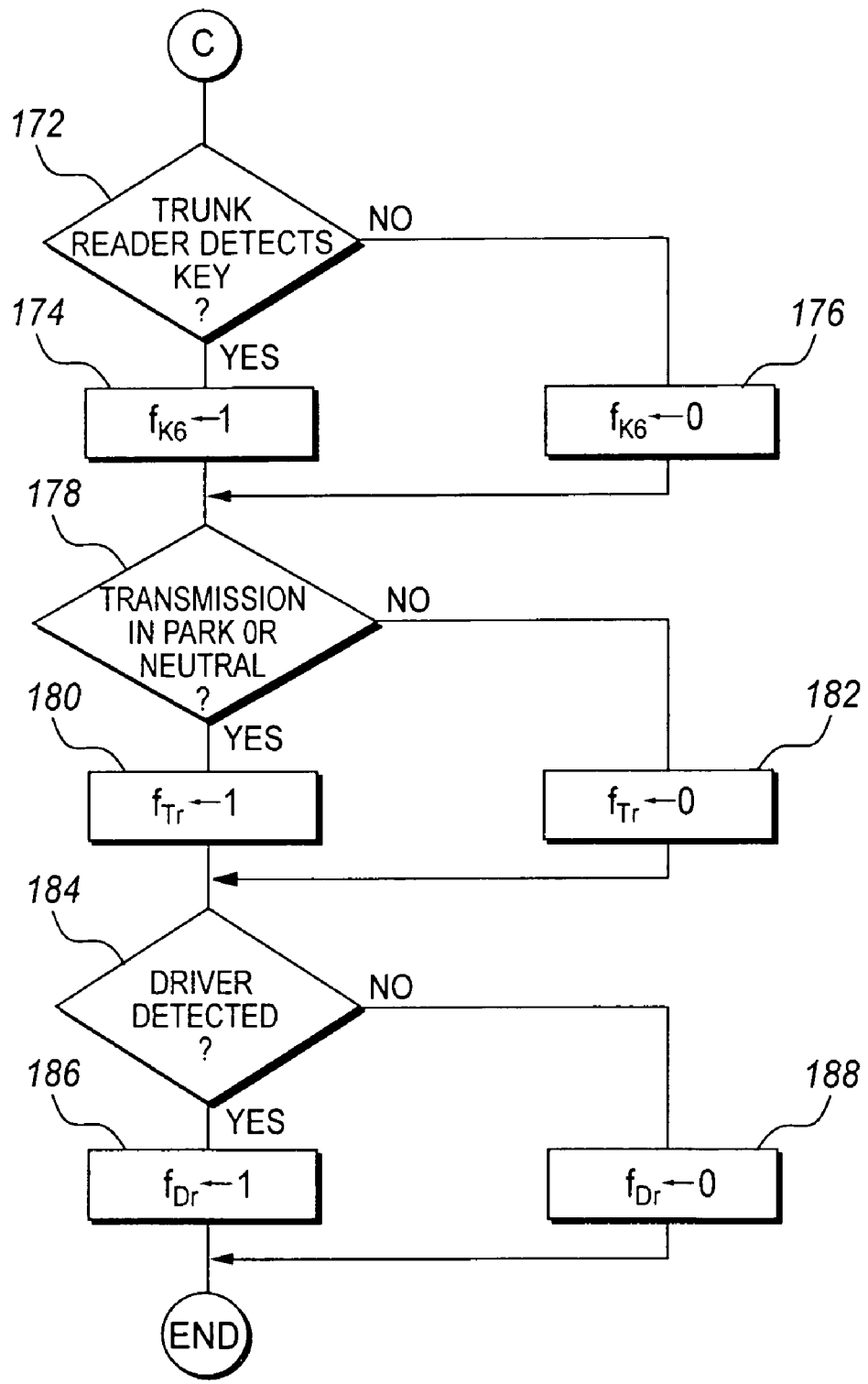

Turning now to FIG. 2, a logic diagram of the wireless anti-lockout system 10 is shown. The trunk contains a lock sensor 14 connected to the trunk lock so that when the trunk is locked, a lock signal 40 is sent to the receiver 32 connected to the microprocessor 24. When the trunk is closed and locked, the signal input is logic or binary 1. When the trunk is unlocked, the signal input is logic 0. The trunk also includes a trunk button 39 which, when depressed by a user, sends a signal input logic 1. If the trunk button 39 is not depressed, the signal input sent is logic 0. The trunk button 39 is necessary if a user locks the keys in the car but the trunk door cannot be closed because the trunk contains a bulk item. The truck lock signal 40 and the signal from the trunk button 39 are applied to a first OR gate 41. Thus, if the trunk lock sensor 14 detects that the trunk is locked or if the trunk button 39 is depressed, the first OR gate 41 will produce an output of 1.

Each of the car doors contain a sensor 14 connected to the locks, such that when the door is unlocked or locked, a lock signal 40 is sent to the receiver 32 connected to the microprocessor 24. When each of the doors are closed and locked, the signal input is logic or binary 1. When each of the doors is unlocked, the signal input is logic 0. The signal inputs sent from two of the door lock sensors and the output from the first OR gate 41 are applied to a first AND gate 42, and the signal inputs sent from two other door lock sensors 14 are applied to a second AND gate 44. The outputs from gates 42 and 44 are applied to a third AND gate 46, which determines whether all four doors and the trunk are closed and locked or not. If all four doors and the trunk are closed and locked (or the trunk button is depressed), the third AND gate 46 will produce an output of 1. If any one of the four doors or the trunk is unlocked, the third AND gate 46 will produce an output of 0. While 2-input and 3-input AND gates are shown providing inputs to another 2-input AND gate, any combination of 2-input, 3-input or 4-input AND gates providing the same resulting output may be substituted for the current combination.

An infrared occupant sensor 18 is located within the automobile and ascertains whether or not an individual is located in the automobile. While any type of infrared sensor may be used to make this determination, a Passive Infrared (PIR) sensor that has Pet Immunity capability to determine whether the occupant is an animal or not and uses an enhanced detection system to determine whether the occupant is a child or not is preferential. The infrared portion of the occupant sensor 18 is able to ascertain the presence of an adult occupant, while the Pet Immunity discriminates between heat signatures of an animal versus an adult. Furthermore, an enhanced detection system ensures that a small child's heat signature is not detected as an adult's heat signature. While the PIR occupant sensor 18 ascertains the presence of an adult, child or animal, the occupant sensor 18 distinguishes between them by outputting a signal 1 if the sensor 18 detects an adult and outputting a signal 0 if the sensor 18 detects an animal or child. The occupant sensor 18 reads whether or not an adult human source remains within the car, and an occupant presence signal 48 is sent by a transmitter 30 to the microprocessor transmitter/receiver 32 so that the microprocessor 24 may process the signal 48. When an adult human source is read, the signal input is 1. When an adult human source is not read, the signal input is 0.

A timer 50, located within the microprocessor 24, records five-second intervals between responses sent from the occupant detection sensor 18. When the occupant detection sensor 18 determines that an adult human is located in the car and the occupant presence signal 48 sends an input of 1 to the microprocessor 24, the timer 50 resets back to a zero time. If the occupant presence signal 48 input is 0, the timer 50 will not reset to a time of zero. When the timer 50 records a five second interval without interruption, then a 1 is sent to the memory 52 and is recorded.

Once two consecutive logic 1 signals have been sent by the timer 50 to the memory 52 and recorded, a logic 1 signal will be applied to a fourth AND gate 54. The fourth AND gate 54 also receives as input the output from the third AND gate 46. Thus, when all four doors and the trunk are closed and locked (or the trunk button 41 is depressed), and an adult occupant is not detected for two five-second intervals, the output from the fourth AND gate 54 will be 1. Otherwise, the output will be 0.

The key chain transponder 12 is connected to the car keys. The key readers 16 are located within all four doors (assuming a typical four-door vehicle), in the roof of the car, and in the trunk of the car so that the readers 16 will determine if the keys are left anywhere in the automobile. The readers 16 send a signal within the car to ascertain whether the keys are in the car. The transponder 12 will alert any reader 16 within range that the transponder 12 is near. A door key signal 56 is sent by a transmitter 30 to the transmitter/receiver 32 connected to the microprocessor 24. If a reader 16 determines that the transponder 12, and therefore the car keys, is in the car, the signal input will be 1. If a reader 16 determines that the car keys are not in the car, the signal input will be 0.

The signal inputs sent from two of the key readers 16 are applied to a second OR gate 58. The signal inputs sent from another two key readers 16 are applied to a third OR gate 60, and the signal inputs sent from the last two key readers 16 are applied to a fourth OR gate 62. The outputs from gates 58, 60, and 62 are applied to a fifth OR gate 64, which ascertains whether or not one of the readers 16 has located the transponder 12 in the car. If one of the readers 16 locates the transponder 12, a logic 1 output will be generated by the fifth OR gate 64. If none of the readers 16 read the transponder 12, the fifth OR gate 64 will produce an output of 0. While three OR gates 58, 60, and 62 provide input to another OR gate 64, any combination of 2-input, 3-input or 4-input OR gates may be provided that produce the same result.

The transmission sensor 22, when present, is connected to the transmission gear. The transmission sensor 22 determines whether the transmission gear is in park or neutral, or whether the transmission is in gear. The transmission sensor 22 sends a transmission signal 66 from a transmitter 30 to the transmitter/receiver 32 connected to the microprocessor 24. If the transmission gear is in park or neutral, the signal input is 1. If the transmission gear is not in park or neutral, the signal input is 0. The signal input from the transmission sensor 22 is applied to a sixth OR gate 70.

The driver detection sensor 20, when present, is located adjacent to the driver's seat and registers whether an individual is sitting in the driver's seat or not. The driver detection sensor 20 may be a weight sensor or any other sensor intended to determine specifically if there is an occupant in the driver's seat. If an individual is sitting in the driver's seat, a driver detection signal 68 is sent to the microprocessor 24. The signal input is 1 if a driver is detected, and the input is 0 if the driver is not detected.

The input from the transmission signal 66 and the input from the driver detection signal 68 are applied to the sixth OR gate 70. The input from the driver detection signal 68 is inverted from 1 to 0, or 0 to 1. The driver detection signal 68 is inverted because the system 10 is designed to determine when an individual is not in the car. When the transmission is in park or neutral and a driver is not detected, the sixth OR gate 70 will produce an output of 1.

The outputs from gates 54, 64, and 70 are applied to a fifth AND gate 72. If the input applied to the fifth AND gate 72 is 1, 1, and 1, resulting in an output of 1, a signal is sent from the transmitter/receiver 32 connected to the microprocessor 24 to the receiver 31 attached to the door lock control 26, and the driver's side door is unlocked. If the fifth AND gate 72 has an output of 0, no signal is sent to the receiver 31 connected to the door lock control 26. Additionally, if the resulting output from the fifth AND gate 72 is 1, a signal may be sent to a receiver 31 connected to an alarm or horn 28 so that the alarm or horn 28 emits a noise to alert the driver that he has locked his keys in the car.

Therefore, if all four doors and the trunk are locked, an adult occupant is not present in the car, the keys are left within the car, the transmission gear is in park or neutral and a driver is not detected, the driver's side door will automatically unlock and an alarm will be activated.

The processing operation performed by the microprocessor 24 in the wireless anti-lockout system 10 is described in FIGS. 3A-3D. As indicated at 100, a door lock sensor 14 determines whether door one is closed and locked or not. If door one is closed and locked, a flag $f_{D1}$ is set to 1 at 102. If door one is unlocked, the flag $f_{D1}$ is set to 0 at 104. Similarly, for a four door vehicle, sensors determine whether doors 2, 3, and 4 are locked, and flags $f_{D2}$, $f_{D3}$, and $f_{D4}$ is set to 1 or 0, as indicated in the chart from 106 through 121. Additionally, as indicated at 122, a determination is made as to whether the trunk is closed and locked or not or whether the trunk button 41 is depressed or not. If the trunk is closed and locked or the trunk button 39 is depressed, a flag $f_{TL}$ is set to 1 at 123. If the trunk is unlocked and the trunk button 41 is not depressed, the flag $f_{TL}$ is set to 0 at 124.

The occupant detection sensor 18, if present, reads for human infrared heat signatures to determine whether an adult individual is located inside the automobile at 125. If the human source is read, a flag $f_S$ is changed to 1 at 126. If the human source is not read, the flag $f_S$ is changed to 0 at 128.

As indicated at 130, the timer 50, if present, determines if five seconds have completed. If five seconds have been completed, a flag $f_T$ is set to 1 at 132. If five seconds have not been completed, at 134 the flag $f_T$ is set to 0. At 136, it is determined whether two consecutive five-second intervals have been recorded into memory 34. If the two intervals have been recorded, at 138, a flag $f_M$ is set to 1. The flag $f_M$ is changed to 0 at 140 if two consecutive five-second intervals have not been recorded.

At 142, a reader 16 located in door one detects whether or not the key chain transponder 12, and therefore the car keys, are near. If the transponder 12 is detected, as indicated at 144, a flag $f_{K1}$ is changed to 1. The flag $f_{K1}$ is set to 0 at 146 if the transponder 12 is not detected. Similarly, if the door 2, door 3, or door 4 readers, or the overhead or trunk readers detect the key chain transponder 12, flags $f_{K2}$, $f_{K3}$, $f_{K4}$, $f_{K5}$, and $f_{K6}$ are set accordingly, as shown from 148 through 176.

The transmission sensor 22, at 178, when present, determines whether the transmission gear is in park or neutral or not. If the gear is in either park or neutral, as at 180, a flag $f_{Tr}$ is changed to 1, and if not in park or neutral, is changed to 0, as at 182. As indicated at 184, the driver detection sensor 20, when present, determines whether a driver is sensed. At 186, if a driver is sensed, a flag $f_{Dr}$ is changed to 1. The flag $f_{Dr}$ is changed to 0 at 188 if a driver is not sensed.

If all of the flags $f_{D1}$, $f_{D2}$, $f_{D3}$, $f_{D4}$, and $f_{TL}$ are changed to 1, the flag $f_M$ is changed to 1, one of the flags $f_{K1}$, $f_{K2}$, $f_{K3}$, $f_{K4}$, $f_{K5}$ or $f_{K6}$ is changed to 1, the flag $f_{Tr}$ is set at 1, and the flag $f_{Dr}$ is set to 0, the microprocessor 24 will transmit a signal to the door lock control 26 to unlock the driver's side door. Additionally, the microprocessor 24 will transmit a signal to an alarm or horn 28 to make a sound alerting the driver that the keys are locked in the car.

It is to be understood that the present invention is not limited to the embodiment described above, but encompasses any and all embodiments within the scope of the following claims.

I claim:

1. A wireless anti-lockout system for automatically unlocking a driver's side door, comprising:
   a plurality of door-lock sensors, each of the sensors generating a door-locked signal when a corresponding door lock is locked;
   a trunk-lock sensor generating a trunk-locked signal when the trunk is locked;
   a manually-activated trunk button for generating a trunk-locked signal when the trunk is open;
   means for generating a key signal;
   means for detecting the key signal and generating a key-detected signal;
   an occupant sensor for generating an occupant signal when an occupant is absent;
   a door lock control for locking and unlocking a door; and
   means for receiving the door-locked signals, the trunk-locked signal from either the trunk-lock sensor or the trunk button, the key—detected signal, and the occupant signal and for activating the door lock control to unlock the door when all of the signals are detected.

2. The wireless anti-lockout system according to claim 1, wherein the means for receiving the door-locked signals, the key-detected signal, and the occupant signal comprises a transceiver and a microprocessor coupled to the transceiver.

3. The wireless anti-lockout system according to claim 1, further comprising a driver detection sensor for generating a driver detection signal when the driver is absent.

4. The wireless anti-lockout system according to claim 1, further comprising a transmission sensor for generating a transmission signal when a transmission is in park or neutral.

5. The wireless anti-lockout system according to claim 1, further comprising:
   an alarm; and
   means for activating the alarm when all of the signals are detected.

6. The wireless anti-lockout system according to claim 1, wherein the means for generating a key signal is a transponder.

7. The wireless anti-lockout system according to claim 1, wherein the means for detecting a key signal and generating a key-detected signal is a transponder reader.

8. A wireless anti-lockout system for automatically unlocking a driver's side door, comprising:
   a plurality of door-lock sensors, each of the sensors generating a door-locked signal when a corresponding door lock is locked;
   a trunk-lock sensor generating a trunk-locked signal when the trunk is locked;
   a manually-activated trunk button for generating a trunk-locked signal when the trunk is open;
   a transponder for generating a key signal;
   a plurality of key readers for detecting the key signal and generating a key-detected signal;
   an occupant sensor for generating an occupant signal when an occupant is absent;
   a door lock control for locking and unlocking a door; and
   means for receiving the door-locked signals, the trunk-locked signal from either the trunk-lock sensor or the trunk button, the key—detected signal, and the occupant signal and the occupant signal and for activating the door lock control to unlock the door when all of the signals are detected.

9. The wireless anti-lockout system according to claim 8, wherein the means for receiving the door-locked signals, the key-detected signal, and the occupant signal comprises a transceiver and a microprocessor coupled to the transceiver.

10. The wireless anti-lockout system according to claim 8, further comprising a driver detection sensor for generating a driver detection signal when the driver is absent.

11. The wireless anti-lockout system according to claim 8, further comprising a transmission sensor for generating a transmission signal when a transmission is in park or neutral.

12. The wireless anti-lockout system according to claim 8, further comprising:
   an alarm; and
   means for activating the alarm when all of the signals are detected.

\* \* \* \* \*